(12) United States Patent
Khasis

(10) Patent No.: US 10,887,431 B2
(45) Date of Patent: Jan. 5, 2021

(54) AUTONOMOUS TELEMATICS PLATFORM

(71) Applicant: Route4Me, Inc., Fort Lee, NJ (US)

(72) Inventor: Dan Khasis, Fort Lee, NJ (US)

(73) Assignee: Route4Me, Inc., Fort Lee, NJ (US)

( * ) Notice: Subject to any disclaimer, the term of this patent is extended or adjusted under 35 U.S.C. 154(b) by 0 days.

(21) Appl. No.: 16/812,277

(22) Filed: Mar. 7, 2020

(65) Prior Publication Data

US 2020/0287775 A1  Sep. 10, 2020

Related U.S. Application Data

(60) Provisional application No. 62/814,958, filed on Mar. 7, 2019.

(51) Int. Cl.
  *G07C 5/00* (2006.01)
  *G07C 5/08* (2006.01)
  (Continued)

(52) U.S. Cl.
  CPC .............. *H04L 69/08* (2013.01); *G07C 5/008* (2013.01); *G07C 5/085* (2013.01); *H04L 29/06068* (2013.01); *H04L 41/16* (2013.01); *H04L 63/0464* (2013.01); *H04L 63/105* (2013.01); *H04L 67/12* (2013.01); *H04L 67/2823* (2013.01); *H04L 69/18* (2013.01);
  (Continued)

(58) Field of Classification Search
  CPC ...... G05B 19/02–42; G07C 3/005–146; G07C 5/002–12; H04L 12/28–2836; H04L 12/46; H04L 12/4633; H04L 29/06068; H04L 41/0226; H04L 41/12–28; H04L 63/02–0492; H04L 63/10–108; H04L 67/12–125; H04L 67/2823; H04L 69/08; H04L 69/18; H04L 69/26; H04L 2209/64; H04L 2463/041; H04W 4/02–90; H04W 12/00–0017; H04W 12/009; H04W 12/08; H04W 12/0808; H04W 84/005; H04W 84/18–22

See application file for complete search history.

(56) References Cited

U.S. PATENT DOCUMENTS 6,222,855 B1  4/2001  Kimber
9,549,425 B2  1/2017  Farrell
(Continued)

*Primary Examiner* — Timothy J Weidner

(57) ABSTRACT

Methods and systems directed to an autonomous bi-directional integration of telematics platforms, e.g., different APIs, through protocol transforming, standardizing, and/or integrating of machine telematics data and/or Internet-of-Things (IoT) data. The platform permits seamless merging of disparate telematics and IoT data streams and resources into a single interface, removing the need to connect to propriety systems individually, and allowing an administrator to concurrently track and manage hundreds of millions of vehicles in a centralized system. Through the process of integrating and standardizing telematics and IoT resources, a custom universal data format may be defined. Machines, vehicles, and IoT devices may establish communications and data links through the platform of the present invention, in which each machine, vehicle, and/or IoT device shares, or fuses, sensor data. To accomplish the objectives of the present invention, signal mapping from one protocol to another protocol may be employed.

2 Claims, 12 Drawing Sheets

(51) Int. Cl.
*H04L 12/24* (2006.01)
*H04L 29/06* (2006.01)
*H04L 29/08* (2006.01)
*H04W 4/029* (2018.01)
*H04W 4/18* (2009.01)
*H04W 4/38* (2018.01)
*H04W 4/40* (2018.01)
*H04W 4/70* (2018.01)
*H04W 12/00* (2009.01)

(52) U.S. Cl.
CPC ............ *H04W 4/029* (2018.02); *H04W 4/18* (2013.01); *H04W 4/185* (2013.01); *H04W 4/38* (2018.02); *H04W 4/40* (2018.02); *H04W 4/70* (2018.02); *H04W 12/009* (2019.01)

(56) References Cited

U.S. PATENT DOCUMENTS

| | | | |
|---|---|---|---|
| 2006/0031586 A1* | 2/2006 | Sethi | H04L 63/0464 |
| 2007/0082679 A1 | 4/2007 | Kim | |
| 2009/0287369 A1* | 11/2009 | Nielsen | H04L 67/18 |
| 2017/0148231 A1 | 5/2017 | Cawse | |
| 2017/0285622 A1* | 10/2017 | Figoli | H04W 4/70 |

* cited by examiner

AUTONOMOUS TELEMATICS PLATFORM

CLAIMS OF PRIORITY

This patent application is a continuation-in-part and claims priority from:
(1) U.S. provisional patent application No. 62/814,958, entitled 'Autonomous telematics platform', filed Mar. 7, 2019.

FIELD OF TECHNOLOGY

This disclosure relates generally to techniques for processing telematics data from different telematics data providers by converting communication protocols to enable different networks to exchange data, and/or interpreting the data in real-time using machine learning, artificial intelligence, and data science to centrally standardize and normalize the different protocols.

BACKGROUND

A vehicle management system may be used to assist in planning and operating routes for a fleet of human-operated and/or autonomous machines, including vehicles of different types, such as, e.g., flying drones, ocean drones, light-duty or heavy-duty, gas, hydrogen, or electric, as well as of different makes, models, or model years. The vehicles in a fleet may be used to perform a variety of tasks that may depend, in-part, on the types of vehicles or makes, models, or model years. A user of the vehicle management system may monitor vehicle locations, vehicle routes of the fleet, and may access information about an operation of the fleet via a user interface, an application programming interface (API), and etc.

Telematics is a compound word of "telecommunication" and "informatics". A telematics system may include one or more vehicles connected to the vehicle management system for providing a service through a wireless communication. A telematics system and platform can be used to bi-directionally communicate between a centralized system and a vehicle, or a vehicle and another vehicle on the same or different platforms. Telematics systems can be used to transmit data about any sort of task, event or activity that has occurred or that needs to occur in the future, e.g. a work assignment. Dispatchers in centralized and de-centralized locations can track, consume, and analyze data originating from the vehicle's onboard or aftermarket telematics transmission unit in real-time or variations of real-time, based on cellular and mobile network restrictions. Data captured from the vehicle, the vehicle onboard computer, or the vehicle's operating system may be retransmitted to other systems, databases, or platforms. In addition to collecting data about the location, speed, altitude, engine diagnostics, and etc., the telematics system may also record information on diverse events that may be aggregated and to analyze historical traffic patterns, or predict future traffic behavior by including the tracked data into a real-time traffic-enabled routing engine. Accordingly, a driver may actively cope with the diverse events. Traditionally, this relates to transporting and receiving data establishing methods between the telematics and the vehicle management system for defining a wireless data protocol. A system discussing telematics data and route optimization has been described in U.S. patent application Ser. No. 15/456,521, entitled, "Complex dynamic route sequencing for multi-vehicle fleets using traffic and real-world constraints", with a filing date on Mar. 11, 2017 (now U.S. Pat. No. 9,792,575, issued on Oct. 17, 2017), and which is incorporated herein by reference in its entirety for all purposes.

Typically, a working environment, such as, e.g., a warehouse, a worksite, or a mine site, may include a variety of machines associated with different telematics data providers. Other examples of diverse working environments may include businesses or holding companies that have multiple corporate entities, each with their own existing contracts and integrations with disparate telematics vendors. Further, the machines may be associated with different equipment manufacturing companies. As such, each of the telematics providers may have a different procedure or protocol for accessing and retrieving the data, such as, e.g., varying data formats. For example, telematics data for the machines may be provided at different types of feeds corresponding to different formats, such as, e.g., the Association of Equipment Management Professionals (AEMP) standard, non-AEMP standards, proprietary formats, and the like. Conventionally, the telematics data for the machines associated with a particular company may be accessed through an application or other sources specific to that company, and in many cases a format that is proprietary as is customary in closed source systems. Moreover, to view or access the telematics data for all the machines on all the different platforms, a user may need to access each of the data sources and systems of the telematics data individually. Therefore, it may be difficult or cumbersome to access the telematics data for the vehicles or machines associated with different companies and in different formats, and in some cases, impossible to merge all the data from all the disparate systems in real-time into a single unified data store, analysis system, and viewing interface.

Currently, there is no standard mode of communication between intelligent systems in a supply and distribution logistics chain. Existing general purpose protocol converters, which are employed to act as translators to allow the various machines from different manufacturers and data vendors to communicate with one another, are primarily intended for connection of devices with different handshaking schemes, such as, e.g., a computer to a printer, or between different networks. These converters are not sophisticated enough to provide functionality in a logistics chain. For example, the existing protocol converters cannot provide without extensive modifications, e.g., configurability for different applications, extensibility to various communication protocols, local and host control of data processing, edge-computing capability, or the ability to sample equipment status variables, ability to handle quality control data, high data conversion/throughput rates, remote system access and maintenance, error checking, and adherence to specific communication standards.

In protocol translator systems, a source delivery server, such as, e.g., a computing device, sends a transaction comprising a number of network packets through a proxy or other type of application server, which delivers the packets to a destination server. The source delivery server may not use the same data format and protocol as the destination server. The transaction may be undeliverable to the destination server when the delivery source server's and the destination server's data formats and protocols are incompatible. In the case of compatible formats and protocols, data transmission and receipt frequency may differ, and this too can lead to server incompatibility. Furthermore, the destination server can restrict the number of source delivery servers that are capable of communicating with it. Protocol translator systems typically use "store and forward" translators. That is, the network packets associated with a particular transaction from the source delivery server are deposited on one or more servers configured for protocol translation and then submitted to the final destination server via a synchronous or asynchronous mechanism. Servers configured for protocol translation can be configured to handle transactions synchronously; however, those transactions typically involve source delivery servers and destination servers that operate with the same data format and protocol, and therefore, network packets associated with a transaction are allowed to pass through a proxy without alteration to the network packets. Additionally, because most servers that receive data from telematics-enabled devices have a very structured and rigidly defined format, doing real-time data and protocol transformation by intercepting data from the origin device is almost impossible without having access to the original source code of the originally proprietary telematics application server.

As such, there is a need in the art for a telematics gateway to allow bi-directional communication between two or more telematics data providers or vendors and to centrally standardize, transform, analyze using machine learning, data science, and/or artificial intelligence in batch mode, real-time mode, or continuously, and/or integrate the different protocols and data formats.

SUMMARY

An administrator of a vehicle management system may have a set of vehicle operation information, such as diagnostic and status information, that the administrator may want to monitor for a fleet of vehicles or assets. For example, the administrator may want to monitor fuel economy for a fleet of vehicles. However, the vehicle fleet may include vehicles having different makes, models, or model years having different operation reporting capabilities, protocols and data formats. As a result, the data available to the vehicle management system may be different for some of the vehicles than other vehicles of the fleet. Because of the variation in data available to the vehicle management system, providing standardized operation information to the administrator can be problematic.

In one aspect, the present invention discloses a system and a method for an autonomous bi-directional integration of telematics platforms, e.g., different APIs, through protocol transforming, standardizing, and/or integrating of machine telematics data and/or Internet-of-Things (IoT) data. The platform permits seamless merging of disparate telematics and IoT resources into a single interface, removing the need to connect to propriety systems individually, and allowing an administrator to concurrently track and manage hundreds of millions of vehicles in a centralized system. Through the process of integrating and standardizing telematics and IoT resources, a custom universal data format may be defined. Machines, vehicles, and IoT devices may establish communications and data links through the platform of the present invention, in which each machine, vehicle, and/or IoT device shares, or fuses, sensor data. For example, a vehicle may share data, e.g., location, speed, event, with another vehicle around the corner that an accident has occurred in the vicinity. In essence, the platform of the present invention permits vehicles and machines to detect high-risk maneuvers and objects through surrounding vehicles and machines that would normally be non-detectable due to range, physical obstruction, and etc.

In another aspect, to accomplish transforming, standardizing and/or integrating telematics and/or IoT data, signal mapping from one protocol to another protocol may be employed. For example, a first protocol is received by the platform, and a mapping interface is generated to a second protocol. The first protocol may then be mapped to the second protocol in accordance with the mapping interface, and the second protocol may become the first protocol of a downstream transformation relationship. The mapping interface may comprise a visual representation, such as, e.g., a relational database, graph database, key/value, NoSQL database, diagram, chart, and/or table, of the relationship between the first protocol and the first format, and the second protocol and the second format. In other embodiments, the opposite is true wherein the second protocol may be mapped to the first protocol and data is transformed from the second protocol to the first protocol according to the mapping interface. For example, the visual representation may comprise links between the measurements and the standardized information. The links may include one or more indications of the approaches or techniques used to standardize the disparate measurements and pointers associating the measurements and standardized information.

BRIEF DESCRIPTION OF THE DRAWINGS

Example embodiments are illustrated by way of example and are not limited to the figures of the accompanying drawings, in which, like references indicate similar elements.

DETAILED DESCRIPTION

Figure 1:
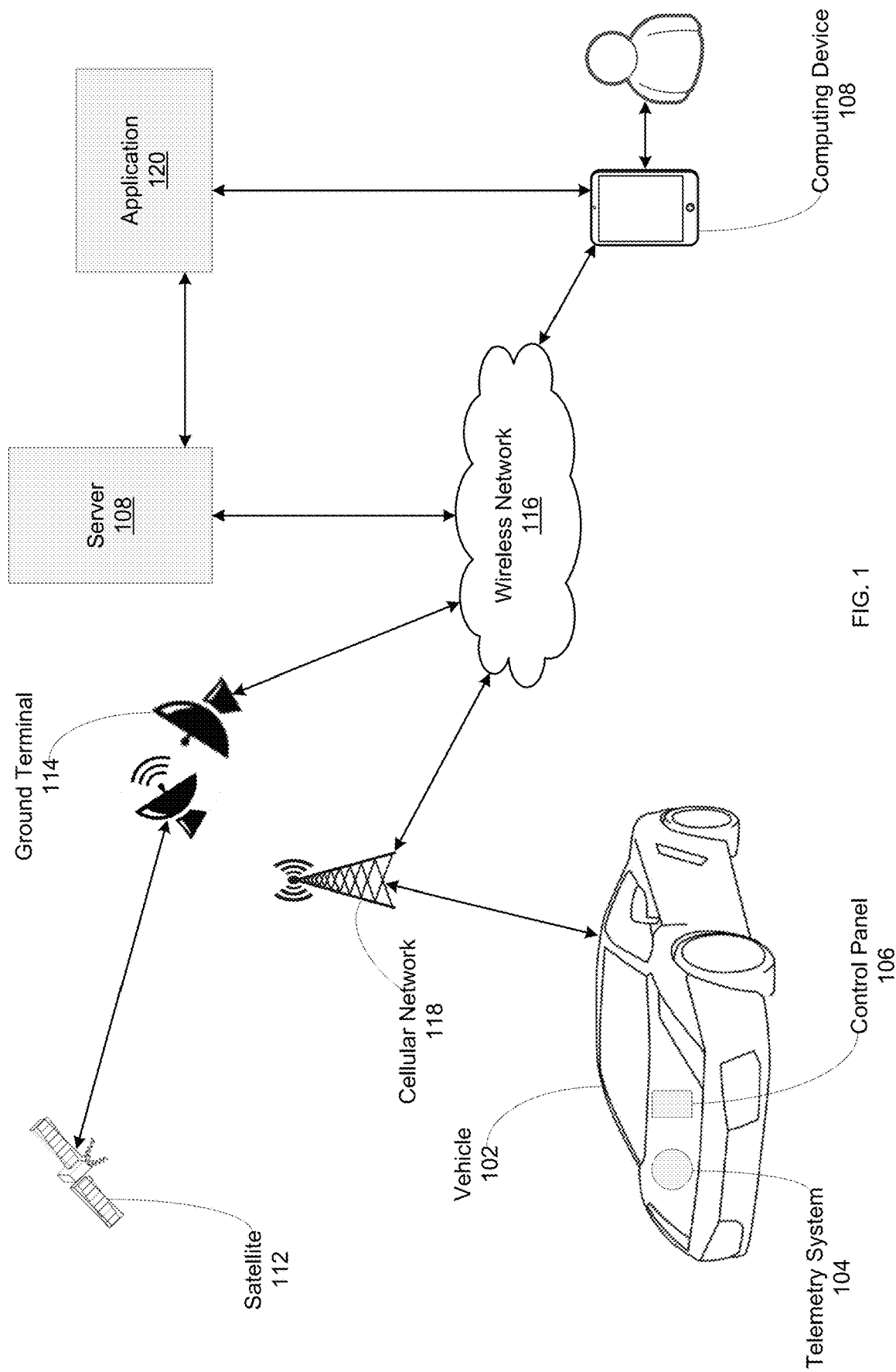
FIG. 1 is a schematic diagram of a vehicular telemetry environment and infrastructure, according to at least one embodiment.

Disclosed are a system and a method for telematics data integration, ingestion, storage, analysis, sensor fusion from different vendors and different devices types into a single unified telematics gateway, that can convert, normalize, store, transform, deduplicate, analyze, stream, and forward telematics data into any other telematics data format and protocol, including streaming real-time visualization and computation of telematics data with no intermediary storage. Although the present embodiments have been described with reference to specific example embodiments, it will be evident that various modifications and changes may be made to these embodiments without departing from the broader spirit and scope of the various embodiments. In addition, the components shown in the figures, their connections, couples, and relationships, and their functions, are meant to be exemplary only, and are not meant to limit the embodiments described herein.

In at least one embodiment, the present invention discloses a system and a method for an autonomous bi-directional integration of telematics platforms, e.g., different APIs, through protocol transforming, standardizing, and/or integrating of machine telematics data and/or Internet-of-Things (IoT) data. The platform permits seamless merging of disparate telematics and IoT resources into a single interface, removing the need to connect to propriety systems individually, and allowing an administrator to concurrently track and manage hundreds of millions of vehicles in a centralized system. Through the process of integrating and standardizing telematics and IoT resources, a custom universal data format may be defined. Machines, vehicles, and IoT devices may establish communications and data links through the platform of the present invention, in which each machine, vehicle, and/or IoT device shares, or fuses, sensor data. For example, a vehicle may share data, e.g., location, speed, event, with any connected system or with another vehicle around the corner that an accident has occurred in the vicinity. The platform of the present invention also permits vehicles and machines to use their onboard sensors to detect ambient environment risk levels and objects through sensors, surrounding vehicles, and machines that would normally be non-detectable due to range, physical obstruction, lack of other telemetry device, and etc.

An example of a sensor positioned along roadways that may provide traffic data input to a vehicle, that would be transmitted to the platform is a loop sensor that may be capable of measuring the number of vehicles passing above the sensor per unit time, vehicle speed and/or other traffic flow data. The sensors may also include cameras, motion sensors, radar ranging devices, RFID devices, and other types of sensors positioned near or embedded within a road. Another example is a digital message sign on or near route segments to inform drivers about upcoming road conditions, such as, e.g., road maintenance and road closure. In addition to the message being displayed, other traffic data that may be transmitted includes: the conditions that caused the message to display, the estimated length of any traffic restrictions in effect, the name of the road that the segment is a part of, and the location of the segment, such as, e.g., state, city, and/or geographical coordinates. In some embodiments, the electronic message information may be provided by the Department of Transportation (DOT) of the respective state in which the road is located. Each state may maintain its own historical database comprising past displayed messages that may be accessible through the network.

An example of a sensor positioned in vehicles that are operated by the user includes a positioning circuitry configured to determine a geographic position of the mobile device 106. The circuitry may include sensing devices that measure the mobile device's travel data, e.g., traveling distance, speed, engine temperature, oil temperature, status of locks and airbags, direction, vehicle manufacturer, vehicle, and etc. Detectors and/or sensors within the positioning circuitry may include an accelerometer and/or a magnetic sensor embedded within the mobile device. The accelerometer may be operable to detect, recognize, and/or measure the rate of change of translational and/or rotational movement. The magnetic sensor, e.g., a compass, may be configured to generate data indicative of a heading. Data from the accelerometer and the magnetic sensor may indicate orientation of the mobile device, and thus the vehicle. Another example is an on-board diagnostic sensor sensing vehicle attributes, such as carbon dioxide emissions. Carbon dioxide emission may be detected by the sensor or it may be computed by the miles-per-gallon (MPG) value of the vehicle assigned to the route, obtained from the vehicle manufacturer. The optimization server may re-sequence the destinations of one or more routes when carbon dioxide emissions data surpasses a predetermined threshold. For example, if the system determines that carbon dioxide emissions level surpasses the acceptable threshold level for a certain route that is caused by extreme increases in elevation, e.g., hills, then the optimization server may re-sequence the destinations of the route to avoid such road segments. Through optimizing routes for carbon dioxide emissions, the system may be able to reduce vehicle stress, lower fuel consumption, and reduce travel time and/or distance.

A transmission system in the mobile device may communicate with the platform and optimization server through a network, such as, e.g., a cellular communication network. The platform may be a software- and web-based program implemented in a processor of a remote computing device that is also coupled with the network. For example, each user may transmit information about its current position through a position detection device coupled with an antenna, such as, e.g., a GPS system. The mobile device may comprise other internal and/or external sensors, such as, e.g., a motion sensor, a microphone, a camera, a biometric sensor, an accelerometer, a gyroscope, and/or a magnetometer, and may identify drivers and/or user behaviors based on sensory data. If the mobile device generates large amounts of high-resolution data, the present invention may optimally receive all of or part of the generated data through simplification and/or compression algorithms, and etc. In addition to user or driver behaviors, the sensory data may allow the system to reveal customer behaviors, such as, e.g., a customer who is chronically not home, that may be factored into the route optimization. A transmission may also include other information linked to the vehicle's current position, such as, e.g., a comparison of the change in coordinates with respect to time, which may be used by the platform to develop information about how a user is maneuvering through traffic and to determine existing traffic conditions, such as, e.g., traffic speed.

In order for the present invention to function properly, a series of intermediary functions, applications, programs, and transformation rules, including data pivoting and unpivoting, which may be stored in a database and executed by a processor, and specify how to universally transform ingress and egress data. A protocol may be defined as a structured communication pattern comprising sets of rules shared by two or more communicating parties to facilitate data exchange. These rules can have two parts: syntax and semantic. Syntax refers to the format of the messages that are to be exchanged, while semantic refers to the sequence of operations to be performed by each party when events occur, such as, e.g., timeouts and reception of messages.

The platform of the present invention may require a number of servers configured for protocol translation including logic, e.g., firmware or middleware, to receive a number of network packets associated with a particular transaction from a source delivery server. The logic may analyze data received to synchronously determine a data format and a protocol of the received network packets, and may apply a number of rule-based protocols. The rule-based protocols may reformat, e.g., transform, the data format and the protocol of the received network packets according to a data format and a protocol of a destination server, relay the reformatted data or network packets to the destination server, and provide a response to the source delivery server. The data may be normalized prior to the transmission to the destination server and may be optionally stored in a SIEM (Security Information Events Management) system. The response may include a status confirmation of the previous transaction. In some embodiments, the system and the method may enable the translation server to automatically search, detect, and connect to, known devices, such as a known source delivery server, e.g., a telematics data provider, or a known destination server, e.g., a machine, vehicle or IoT device. For example, when a machine, vehicle and/or IoT device wish to establish a communication session with the protocol translation servers, a handshake procedure may be carried out using a cryptographically secure protocol, such as, e.g., Secure Sockets Layer (SSL). The automatic authentication handshake permits a device to self-provision onto the platform by verifying that the device is part of a pre-approved list eligible for syndication. The handshake procedure may comprise determining whether each party has certain required attributes, such as, e.g., a name, location, owner, or role, to exchange cryptographic data for enabling shared keys for establishing the communication session.

In some embodiments, the system and the method may allow for transforming, standardizing, and/or integrating of telematics protocol for a plurality of machines or machine manufacturers, including receiving telematics data from multiple telematics data providers in communication with the machines, determining whether the telematics data from each of the telematics data providers is in a standard format, and transforming the telematics data to the standard format if the data is in a non-standard format. The transformed data may be used for data replication, data synchronization, real-time or batch backups, and data mirroring. Transformed data may be inserted directly, or through an intermediary telematics service, into any other compatible telematics system. A graphical user interface (GUI) may display the telematics data in the standard format to an administrator.

Since a vehicle fleet may include vehicles having different makes, models, and or model years having different operation reporting capabilities, the data available from the data providers can be different for some vehicles of the vehicle fleet than for other vehicles. Telematics data from the telematics data providers may be in non-standard formats, such as, e.g., Association of Equipment Management Professionals (AEMP) standard, or any other data standards. Each of the telematics data providers may include a web-based application programming interface (API) for accessing the associated telematics data in the corresponding formats. Telematics data providers typically use proprietary data communication protocols. These various protocols are not interchangeable, and to the contrary, they only enable communication among a particular manufacturer, or group, of machines. Telematics and IoT data providers may include, but are not limited to, a datacenter or data warehouse that stores telematics data of the associated machines, an onboard telematics system associated with the machines, and/or a third-party provider.

For example, if a vehicle fleet includes both light-duty vehicles, such as, e.g., commuter vehicles, and heavy-duty vehicles, such as, e.g., semi-trailers, the light-duty and heavy-duty vehicles may report different operation measurements usable for understanding the operation of the vehicles. The heavy-duty vehicles and one group of the light-duty vehicles may, for instance, maintain an odometer measurement readable by a telemetry system. On the other hand, another group of light-duty vehicles in the vehicle fleet may not be capable of outputting odometer measurements readable by same telemetry system. Instead, drivers of the vehicles may be expected to manually read the odometer measurements and provide the measurements with corresponding timestamps for input to the platform. In another example, a vehicle fleet may include different makes and model years of vehicles having different fuel measurement reporting capabilities. One group of makes and years of vehicles in the fleet may provide measurements of lifetime usage of fuel that are readable by the telemetry system. On the other hand, another group having different makes and years of vehicles may provide running measurements of fuel used per time that may also be readable by the telemetry system. The different fuel measurements from the groups can be provided to the platform so that uniform fleet vehicle fuel consumption information can be determined for the trucks and provided to a user of the vehicle platform.

The meaning of measurements related to vehicles in a fleet may further depend on the make, model, type, and/or year of the vehicles, such as, e.g., a low fuel indication from a vehicle or machine may correspond to a certain percentage of remaining fuel in the fuel tank, for example, 20% fuel remaining, and may differ from the low fuel indication from another vehicle or machine which corresponds to a higher percentage of fuel remaining in the fuel tank, for example, 25% fuel remaining. In addition, measurements available from a motorcycle may have a different meaning from the measurements available from a car, truck, crane, fork lift, or another vehicle type.

The type and capabilities of the telemetry system may also influence the available measurements from vehicles that are provided to the platform. For example, some vehicle telemetry systems may be capable of communicating with an engine computer to obtain a measurement of engine revolutions per minute (RPM), recording video from a dashcam or other sensors, and etc. Other vehicle telemetry systems may not be capable of communicating with the engine computer, or other sensor data, and thus may rely on one or more other measurements usable to determine the RPM measurement for the vehicle. In another example, some vehicle telemetry systems may be equipped with GPS features that enable telemetry system to calculate a distance traveled by the vehicles. The calculation may provide measurements comparable to the odometer readings of the vehicles. In yet another example, some telemetry systems may be capable of determining fuel economy by directly obtaining measurements by the vehicles. On the other hand, other vehicle telemetry systems may be capable of using measurements of an amount of fuel consumed and distance traveled to calculate fuel economy.

The platform of the present invention may either operate in a default autonomous mode whereby processes are fully automated from end-to-end without user intervention including having the ability to autonomously authorize complete cycles, or it may operate in a user-guided semi-autonomous mode. The user-guided semi-autonomous mode may be used to, e.g., override certain processes or procedures, check for availability of assets, maintain visual inspection, and/or troubleshoot machines and operations. The user may interact through a graphical user interface, such as, e.g., a virtual or augmented reality environment, or through a voice-activated personal assistant. Similar to a human body's autonomous nervous system unconsciously controlling vital organs and biological functions while responding to stimuli, the autonomous system and method of the present invention may respond and adapt to dynamic demands in real-time. The system may provide automated functions that may accelerate or decelerate the logistics supply pipeline by either speeding up or slowing down the various operations within downstream processes and their corresponding modules, while eliminating or automating many of the labor-intensive and time-consuming operations required in legacy systems. A graphical user interface may be communicatively coupled to the server and may provide interactive control to one or more users of the network. In some embodiments, a simulator may be used to help user management make strategic decisions. The simulator may mimic different aspects, such as, e.g., demands, supplies, inventories, manufactures and transportation, before an operation is actually conducted. The user may view the predicted outcome of a given operation and may adjust parameters to further improve the performances or to avoid complications.

FIG. 1 is a schematic diagram of a vehicular telemetry environment and infrastructure, according to at least one embodiment. A vehicle 102 may include telemetry system 104, which may comprise a telemetry processor, a wireless communications processor, a global positioning system (GPS) device, an accelerometer, a non-volatile memory, and a provision for an on-board diagnostic (OBD) interface for communication with a vehicle control panel 106. The control panel 106 may comprise a network communications system and bus, an electronic control module (ECM), a power train control module (PCM), an electronic control unit (ECU), and other engine control/monitor computers and microcontrollers. In some embodiments, there may be a Bluetooth module (not shown) for communication with the telemetry hardware system 104. The telemetry system 104 may monitor and log raw telematics data, such as, e.g., vehicle data such as vehicle identification number (VIN), odometer reading, current speed, heading direction, engine RPM, battery voltage, engine temperature, coolant level, accelerator and brake pedal positions, transmission data, mass air flow and fuel data, tire pressure, oil levels, and emission control data; GPS coordinate data; accelerometer data such as magnitude and direction of acceleration, orientation data and vibration and shock data, traffic data; near-field communication (NFC) data such as driver identification and verification; vehicle sensor data such as distance, time, amount and type of inventory, weight data, driver distraction data, remote worker data, school bus warning lights, doors and windows open/closed data; and data concerning an object associated with a Bluetooth beacon such as object acceleration data, object temperature data, battery level data, object pressure data, object luminance data and user defined object sensor data. These objects may include, but are not limited to, packages, equipment, drivers and support personnel; and, object data may be used to indicate damage to an article or a hazardous condition to an article. The different categories of data are illustrative and may further include other data.

A category of raw telematics data may be a grouping or classification of a type of similar or related data, and may include a complete set or a subset of the raw telematics data. For example, GPS coordinate data may be a group or type of similar data; accelerometer data may be another group or type of similar data. A log may include any combination of data categories. A person skilled in the art may recognize that the makeup, format and variety of each log of raw telematics data in each category is complex and may be significantly different from another category. The amount of data in each category may also be significantly different, and the frequency and timing for communicating the data may vary greatly. The monitoring, logging and communicating of multiple logs of raw telematics data may result in the creation of raw telematics big data. For example, the data can be used for auditing, insertion into a blockchain, real-time financial analysis, cost analysis, estimated labor costs, real-time fraud analysis, a data backend for machine learning applications, and etc.

The vehicular telemetry environment and infrastructure may provide communication and exchange of raw telematics data, commands, and messages between one or more server 108, computing device 110 such as, e.g., a desktop computer, mobile device, or wearable device, and vehicle 102. Satellite 112 may provide bi-directional communication with ground terminal 114 through a radio frequency (RF) signal and/or an optical signal. The ground terminal may be communicatively coupled with wireless network 116. Computing device 120, server 108, and telemetry system 104 of vehicle 102 may communicate over wireless network 116 through corresponding software application 120. In some embodiments, cellular network 118 may also be communicatively coupled to wireless network 116. Data and information may be sent from telemetry system 104 to control panel 106, to cellular network 118, to wireless network 116, and then to server 108. Computing device 108 may be able to access the data and information on server 108. Alternatively, data and information may be sent from server 108 to wireless network 116, to cellular network 118, and then to telemetry system 104.

Figure 2:
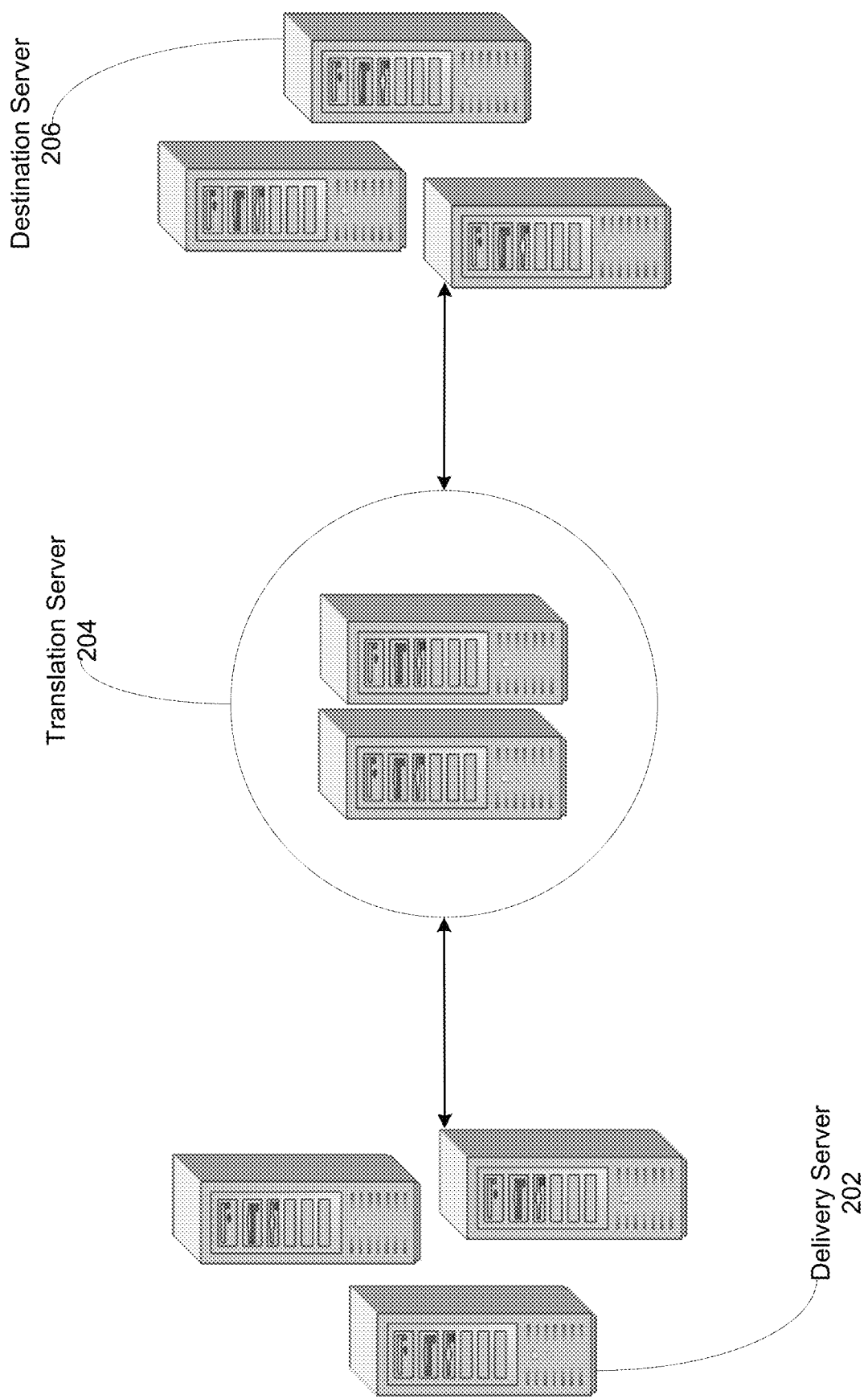
FIG. 2 is a schematic diagram of a protocol translation system, according to at least one embodiment.

FIG. 2 is a schematic diagram of a protocol translation system, according to at least one embodiment. The system may include one or more source delivery server 202 comprising a plurality of data formats and protocols, such as, e.g., simple mail transfer protocol (SMTP), hypertext transfer protocol (HTTP), Quick UDP Internet Connections (QUIC), and/or a cloud computing source protocol. Source delivery server 202 may be communicatively coupled to one or more protocol translation server 204, such as, e.g., through a wireless network, for rule-based protocol translation between source delivery server 202 and one or more destination server 206. Destination server 206 may also comprise a plurality of data formats and protocols, such as, e.g., simple mail transfer protocol (SMTP), hypertext transfer protocol (HTTP), and/or a cloud computing source protocol, and may differ from that of source delivery server 202. Destination server 206 may also be communicatively coupled with translation server 204.

Protocol translation server 204 may include logic that can receive a number of network packets associated with a particular transaction from source delivery server 202 to destination server 206 to facilitate subsequent application of rule-based protocols. Based on data of the network packets associated with a particular transaction, a rule-based protocol may be based on a criteria specified by a user or administrator, and may comprise embedded rules, limitations, data maps and routes, and/or characteristics of destination server 206 such as, e.g., a specification of destination server 206, data and format of network packets associated with a particular transaction, and presence of communication restrictions. The logic may determine a data format and protocol of the received network packets, and reformat it according to that of destination server 206 prior to relaying the packets to destination server 206. For example, a number of rule-based protocols based on an SMTP source delivery server 202 may relay data to a destination server 206 of varied protocols, such as, e.g., SMTP and HTTP. In such an example, protocol translation server 204 may be an SMTP-translator, capable of reformatting data and protocol of SMTP transactions to relay the SMTP network packets to destination server 206. Although three delivery server 202s and three destination server 206s are illustrated, the present invention is not so limited and may include more or fewer of each.

For example, protocol translation server 204 may standardize disparate measurements obtained by a telemetry system into a uniform set of information related to a vehicle or machine fleet for storage or presentation to a user of the platform, such as, e.g., estimating diagnostic or status information, using one or more varying measurements from other vehicles or machines in the fleet. The standardized information can enable the user of the platform to receive meaningful vehicle operation information in a uniform form while relieving the user of the burden of considering more than a single source. The standardized measurements may be readily compared to other measurements for the vehicle or machine or across diverse vehicle or machine types, makes, models, and/or model year.

Protocol translation server 204 may estimate information for multiple vehicles, such as, e.g., determining the odometer readings indicative of a distance traveled by the vehicles or machines for one group of vehicles or machines in a fleet based on odometer measurements provided by the telemetry systems of vehicles or machines in another group. The platform may also determine a distance traveled by one group in a fleet based on GPS measurements of vehicles and machines in another group, such as, e.g., by extrapolating the data, calculating a line-distance traveled by the vehicles within the fleet, and/or automatically preparing data in a big data compatible format to enable operating expense audits, capital expense audits, and generating financial models to determine fleet savings. In some embodiments, protocol translation server 204 may switch between two or more sources as available measurements change or select between, or prioritize, the measurements based on a quality value, such as, e.g., accuracy or reliability of the data. Protocol translation server 204 may group vehicles or machines having one or more similar criteria or measurements to assist in the standardization of disparate measurements for vehicles or machines using one or more rule sets corresponding to the group.

Other examples of ways that the protocol translation server 204 may standardize disparate measurements are next described, such as, e.g., total time engine on, hydraulic status and revolutions per minute (RPM). A user may desire to determine the total number of hours that engines of vehicles or machines of a fleet are turned on. The engine computers of some vehicles or machines of the fleet may directly measure the total number of hours the engines are on, and these measurements may be obtained by protocol translation server 204. However, for some vehicles or machines in the fleet, the only indication of engine on-time is a binary status of whether the engines are turned on or off. Protocol translation server 204 may, for these vehicles, calculate the total engine-on time based on the duration of the binary status that indicates the engines are turned on.

A user may desire to determine the hydraulic status of vehicles or machines in a fleet. Some vehicles or machines in the fleet may directly measure their hydraulics and provide operational status to their telemetry systems. Other vehicles or machines in the fleet, however, may provide the hydraulic status based on a calculation using the hydraulic pressure level. Protocol translation server 204 may, for these vehicles or machines, determine that the hydraulics are on when the hydraulic pressure is greater than zero.

A user may desire to determine the RPMs of engines of vehicles or machines in a fleet. The RPM measurements, however, may be provided differently according to makes, models and/or model year. The platform may access information regarding how the different makes, models, and years report measurements so that protocol translation server 204 may standardize the estimated RPM information into a common form.

Because the accuracy or precision of measurements may vary significantly depending on, e.g., the source, timing, frequency, estimated accuracy, and/or sophistication of the measurements, the measurements obtained by the platform may be associated with one or more indications of quality, such as, e.g., assigning a value score. In some embodiments, the indications of quality of the measurements may be utilized by the platform to manage or process the measurements, such as, e.g. protocol translation server 204 may request or discard certain measurements related to particular vehicles or machines in a fleet based on the one or more indications of quality. Timestamps may also be assigned to the measurements and/or determined estimates of information by the platform, and may be used to track frequency of the determinations, as well as in determining or assigning quality indications to the determinations. For example, a recently determined estimate may correspond to a higher quality score than a less recently determined estimate.

Figure 3:
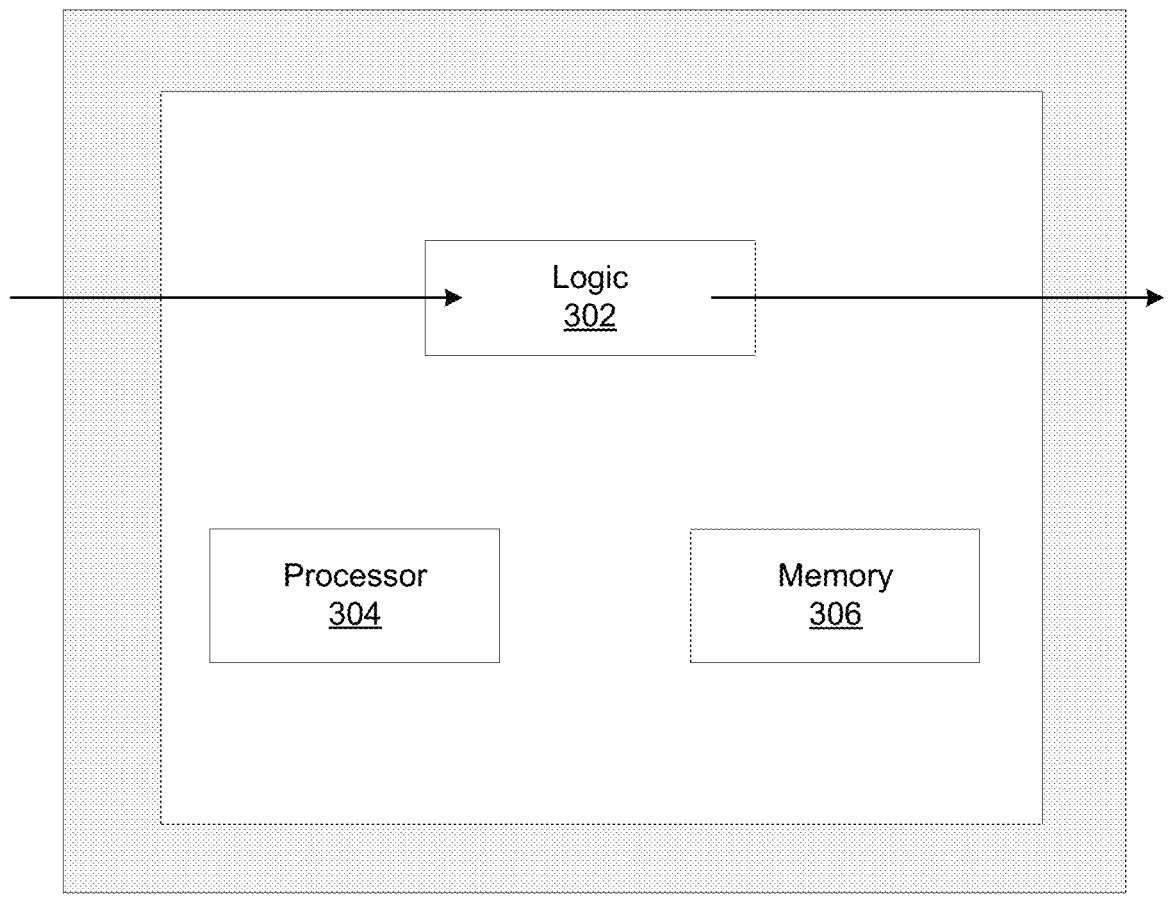
FIG. 3 is a block diagram of a protocol translation server, according to at least one embodiment.

FIG. 3 is a block diagram of a protocol translation server, according to at least one embodiment. The server may include logic 302 communicatively coupled with processor 304, which in-turn may be communicatively coupled with memory 306. As used herein, "logic" may imply hardware, such as, e.g., various forms of transistor logic and application specific integrated circuits (ASICs), as opposed to computer executable instructions, such as, e.g., software and firmware. For example, rule-based protocols and applications may be stored on a non-transitory computer readable memory (CRM) associated with the protocol translation server and may be downloadable by local memory 306 and executable by processor 304. The CRM may include volatile and/or non-volatile memory, and may be communicatively coupled to a computing device. Volatile memory may be memory that depends upon power to store information, such as, e.g., various types of dynamic random access memory (DRAM). Non-volatile memory may be memory that does not depend upon power to store information, such as, e.g., solid state media such as flash memory, EEPROM, phase change random access memory (PCRAM), magnetic memory such as a hard disk, tape drives, floppy disk, tape memory, optical discs, digital video discs (DVD), high definition digital versatile discs (HD DVD), compact discs (CD), solid state drive (SSD), flash memory, as well as other types of machine-readable media. The CRM may comprise computer-readable instructions stored thereon that may be executed by processor 304 to provide a particular functionality.

The CRM may be internally coupled to processor 304 via a communication path, such as, e.g., an electronic bus wherein the CRM is one of volatile, non-volatile, fixed, and/or removable storage medium. Examples of an electronic bus may include, e.g., Industry Standard Architecture (ISA), Peripheral Component Interconnect (PCI), Advanced Technology Attachment (ATA), and Small Computer System Interface (SCSI), Universal Serial Bus (USB). In some embodiments, the communication path may be remote such that the CRM is coupled to processor 304, through wire or wire-less, via a network connection, such as, e.g., a local area network (LAN), a wide area network (WAN), a personal area network (PAN), and the Internet. As such, the CRM may be associated with a first computing device, such as, e.g., a server, and processor 304 may be associated with a second computing device, such as, e.g., a client. In other embodiments, local memory 306 of the protocol translation server may be configured for protocol translation that can store the rule-based protocols and executable by processor 304.

Figure 4:
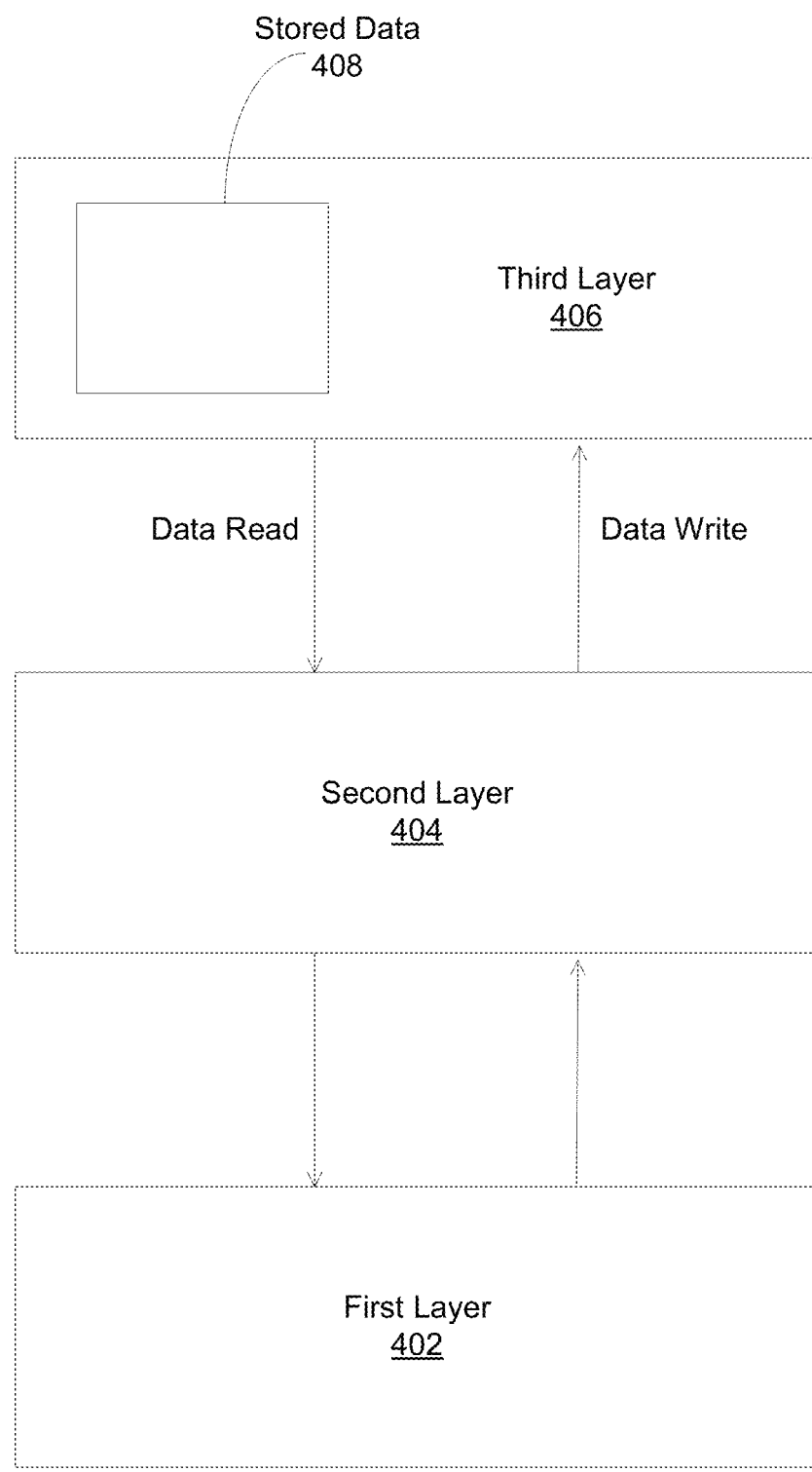
FIG. 4 is a schematic diagram of an example architecture in which the present invention may be employed.

FIG. 4 is a schematic diagram of an example architecture in which the present invention may be employed. First layer 402 may make a request for services, such as, e.g., that data be written and/or read. Second layer 404 may receive the request and may then fulfill it, assuming, for example, that it is able to do so. There are a variety of services that may be provided by second layer 404. Primarily, such services are data-related, such as, e.g., authentication, authorization, data storage and/or retrieval. Second layer 404 may supplement and/or enhance services that may be available from third layer 406. One service that may be provided by second layer 404 includes security. For example, this may include firewall functionality, such as, e.g. packet filtering, inspection, and/or format validation, and data encryption and/or decryption. Encryption may include a process in which data is coded so that the content of the data is not capable of being employed and/or understood by a person and/or a device without first being decoded back to the previous form or format it had prior to being encrypted. Decryption may be a process of decoding encrypted data back to the form or format it had prior to encryption. The data, once encrypted, may be stored by or at third layer 406 at stored data 408. Likewise, second layer 404 may, upon another request for services by first layer 402, such as, e.g., a read request, retrieve the stored, encrypted data from third layer 406, decrypt it, and provide it to first layer 404.

Any two layers, such as, e.g., first layer 402 and third layer 406, may reside on the same computing platform, although the present invention is not so limited in scope. In some embodiments, any of first layer 402, second layer 404 and/or third layer 406 may reside on multiple computing devices. Third layer 406 may treat data substantially the same regardless of whether or not the data is encrypted. This may provide some benefits, such as, e.g., making interoperability with other systems possible. In other embodiments, encryption may be applied only to a payload portion of the transferred data, making encryption transparent to the storage device.

Further, data may be encrypted using a first encryption protocol by first layer 402 and transferred to second layer 404 using a first data transfer protocol. Data may be decrypted and translated from the first data transfer protocol to a second data transfer protocol at second layer 404. Translation may refer to reformatting data from a format that may be compatible with one data transfer protocol to a format that may be compatible with a different data transfer protocol. Data may also be re-encrypted at second layer 404 using a second encryption protocol and delivered to third layer 406 using a second data transfer protocol. A particular data safeguarding strategy and/or data transfer protocol may be used for transferring data from first layer 402 to second layer 404 and another data safeguarding strategy and/or data transfer protocol may be used for delivering data to and storing data at third layer 406. In some embodiments, data transfer among the layers may not be encrypted, or only encrypted between specific layers.

Figure 5:
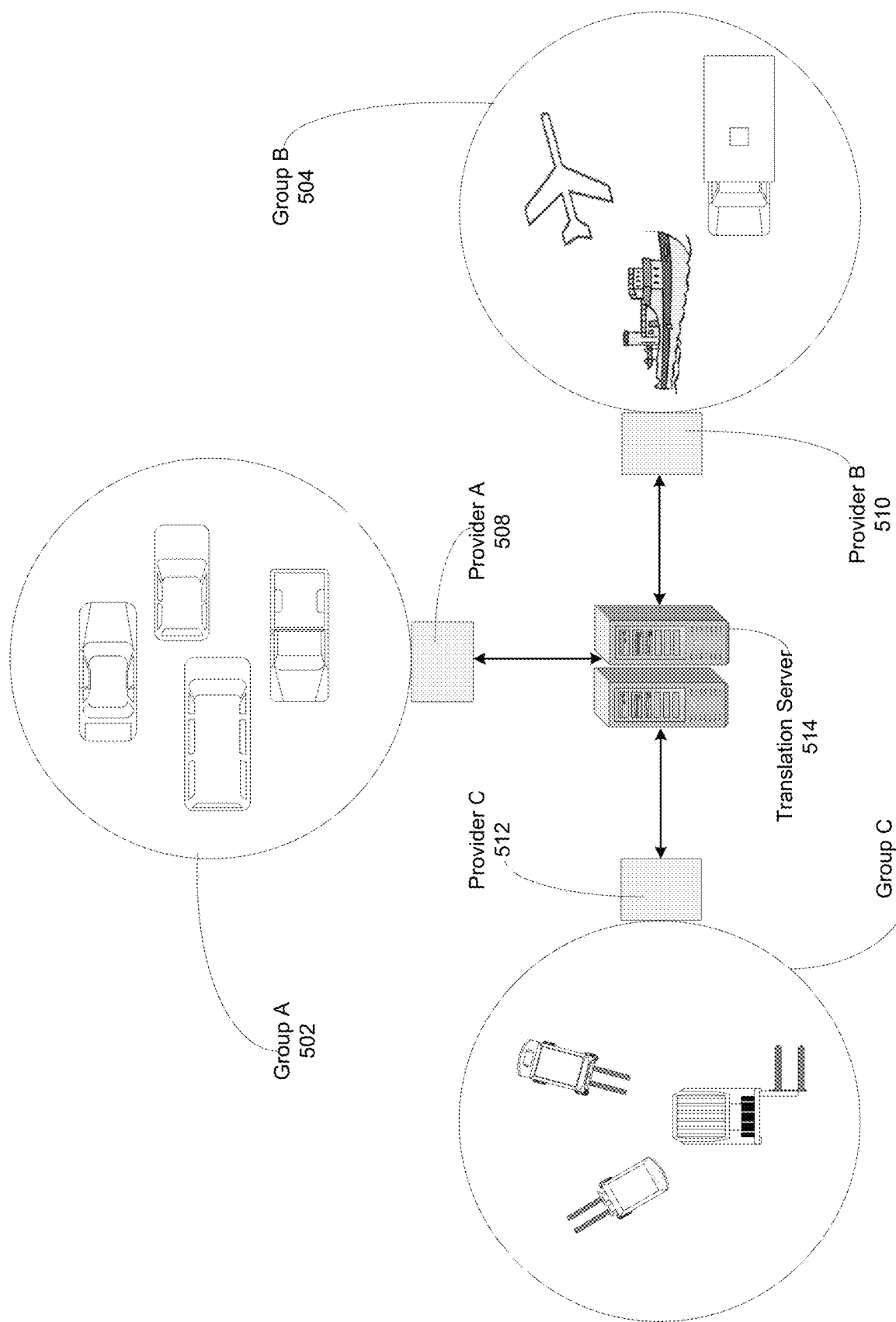
FIG. 5 is a schematic diagram of a telematics environment, according to at least one embodiment.

FIG. 5 is a schematic diagram of a telematics environment, according to at least one embodiment. The environment may include group A 502, group B 504, and group C 506, which may comprise one or more various types of machines and vehicles. The machines and vehicles may be organized based on a similarity criterion, such as, e.g., manufacturer and/or functionality, and may include manned, fully autonomous and/or semi-autonomous machines and vehicles. For example, group A 502 may be personnel transportation machines and vehicles, such as, e.g., passenger cars; group B 504 may be warehouse or worksite machines and vehicles, such as, e.g., forklifts, pallet trucks, and mining trucks; and group C 506 may be long distance machines and vehicles, such as, e.g., airplanes, trucks, marine ships, and freight trains.

The environment may include telematics data provider A 508, provider B 510, and provider C 512, which may be in communication with the machines and vehicles of group A 502, group B 504, and group C 506. Telematics data provider A 508, provider B 510, and provider C 512 may be configured to monitor or read telematics data associated with the respective machines and vehicles, such as, e.g., over a network. The network may be, but not limited to, a wide area network (WAN), a local area network (LAN), an Ethernet, an Internet, an Intranet, a cellular network, a satellite network, or any other suitable network for transmitting data between the machines and vehicles and the telematics data provider. In various embodiments, the network may include a combination of two or more of the aforementioned networks and/or other types of networks known in the art. The network may be implemented as a wired network, a wireless network or a combination thereof. Data transmission may take place over the network with a network protocol such that the data transmission is in an encrypted format, or any other secure format. Telematics data provider A 508, provider B 510, and provider C 512 may be configured to relay the telematics data retrieved from the machines and vehicles of group A 502, group B 504, and group C 506 to protocol translation server 514, which in turn may be communicatively coupled to one or more destination servers, as previously discussed.

In another aspect, to accomplish transforming, standardizing and/or integrating telematics and/or IoT data, signal mapping from one protocol to another protocol may be employed. For example, a first protocol is received by the platform, and a mapping interface is generated to a second protocol. The first protocol may then be mapped to the second protocol in accordance with the mapping interface, and the second protocol may become the first protocol of a downstream transformation relationship. The mapping interface may comprise a visual representation, such as, e.g., a relational database, graph database, key/value, NoSQL database, diagram, chart, and/or table, of the relationship between the first protocol and the first format, and the second protocol and the second format. In other embodiments, the opposite is true wherein the second protocol may be mapped to the first protocol and data is transformed from the second protocol to the first protocol according to the mapping interface. For example, the visual representation may comprise links between the measurements and the standardized information. The links may include one or more indications of the approaches or techniques used to standardize the disparate measurements and pointers associating the measurements and standardized information.

Figure 6:
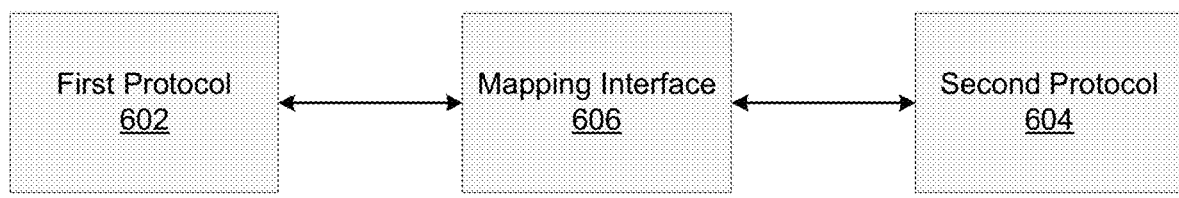
FIG. 6 is a block diagram of protocol mapping of the present invention, according to at least one embodiment.

FIG. 6 is a block diagram of protocol mapping of the present invention, according to at least one embodiment. A first protocol 602, such as, e.g., for vehicle telematics data and/or IoT data from a data provider, may be mapped to a second protocol 604, such as, e.g., to normalizing and standardizing with the platform of the present invention and thus, with vehicle telematics data and/or IoT data from another data provider. A mapping interface 606 may be generated and may comprise a visual representation, such as, e.g., a relational database, diagram, chart, and/or table, of the relationship between the first protocol and the first format and the second protocol and the second format. For each transformation from first protocol 602 to second protocol 604—or vice versa—various designation information may be stored in a mapping definition information area and data is transferred in accordance with the designation or mapping information.

Figure 7:
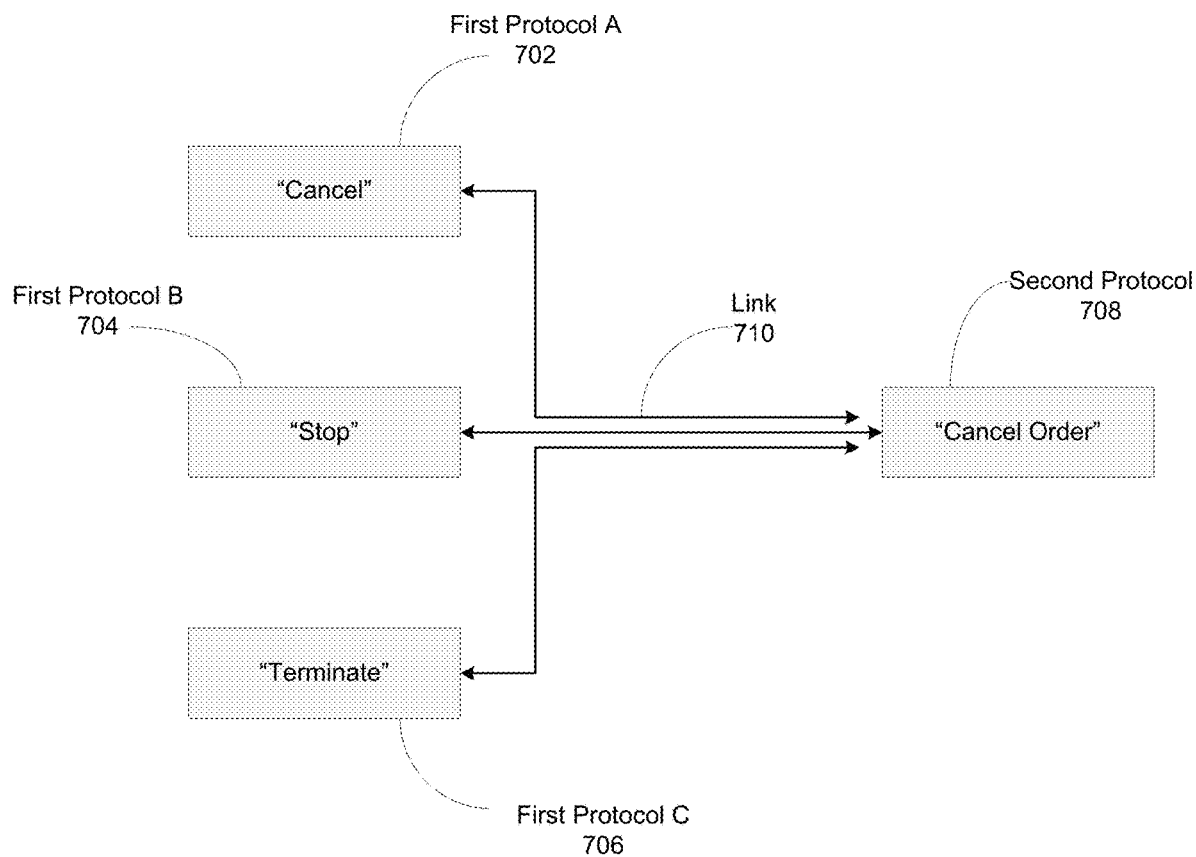
FIG. 7 is block diagram of an exemplary mapping visual representation of the present invention, according to at least one embodiment.

FIG. 7 is block diagram of an exemplary mapping visual representation of the present invention, according to at least one embodiment. First protocol A 702, first protocol B 704, first protocol C 706 may represent three separate telematics data or IoT data providers, and may comprise the data "cancel", "stop", and "terminate", respectively. The data may be transformed, standardized and integrated to be understood as "cancel order" in second protocol 708, as shown by link 710. A telematics or IoT data provider may include, but not limited to, a datacenter or data warehouse that stores telematics data of the associated machines, an onboard telematics system associated with the machines, and/or a third-party provider.

Figure 8:
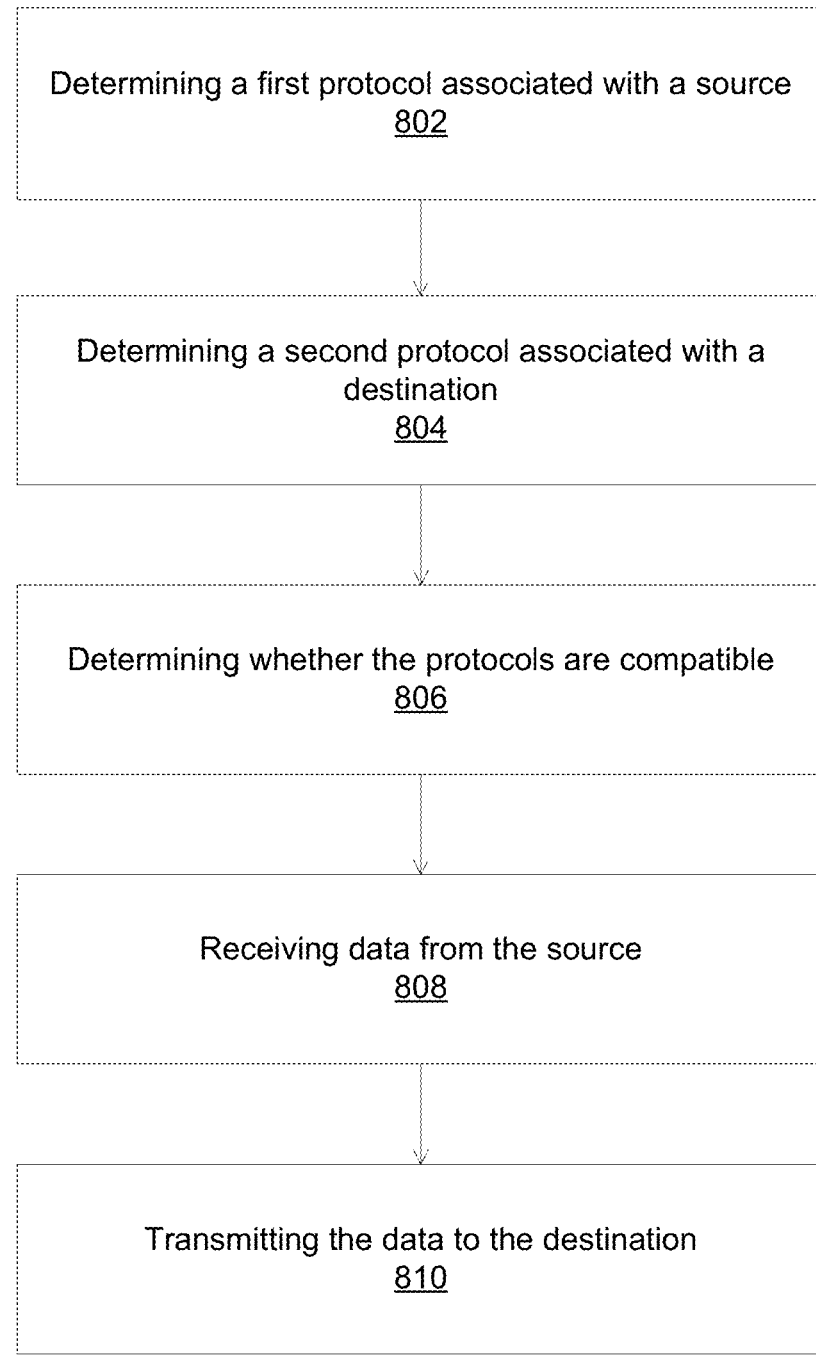
FIG. 8 is a flow diagram of a method for normalizing and standardizing a data transaction from a source to a destination, according to at least one embodiment.

FIG. 8 is a flow diagram of a method for normalizing and standardizing a data transaction from a source to a destination, according to at least one embodiment. Operation 802 determines a first protocol associated with a source, such as, e.g., a telematics data provider, server, on-board sensor, and/or external sensor. Operation 804 determines a second protocol associated with a destination, such as, e.g., a telemetry system of a vehicle or machine and/or a user interface of the platform of the present invention. Operation 806 determines whether the first protocol from the source and the second protocol from the destination are compatible, such as, e.g., in the same format. Operation 808 receives data from the source. The data may be in a form based on the first protocol. Operation 810 transmits the data to the destination. The data may be in the form based on the second protocol. The determination of operation 806 regulates whether the data being sent from the source to the destination is converted to the second protocol, such as, e.g., if the data are not compatible, then the platform may normalize and standardize the data by converting the first protocol to the second protocol according to a mapping interface. In some embodiments, the data may be normalized and standardized based on a third, custom protocol that is determined by an administrator of the platform.

Figure 9:
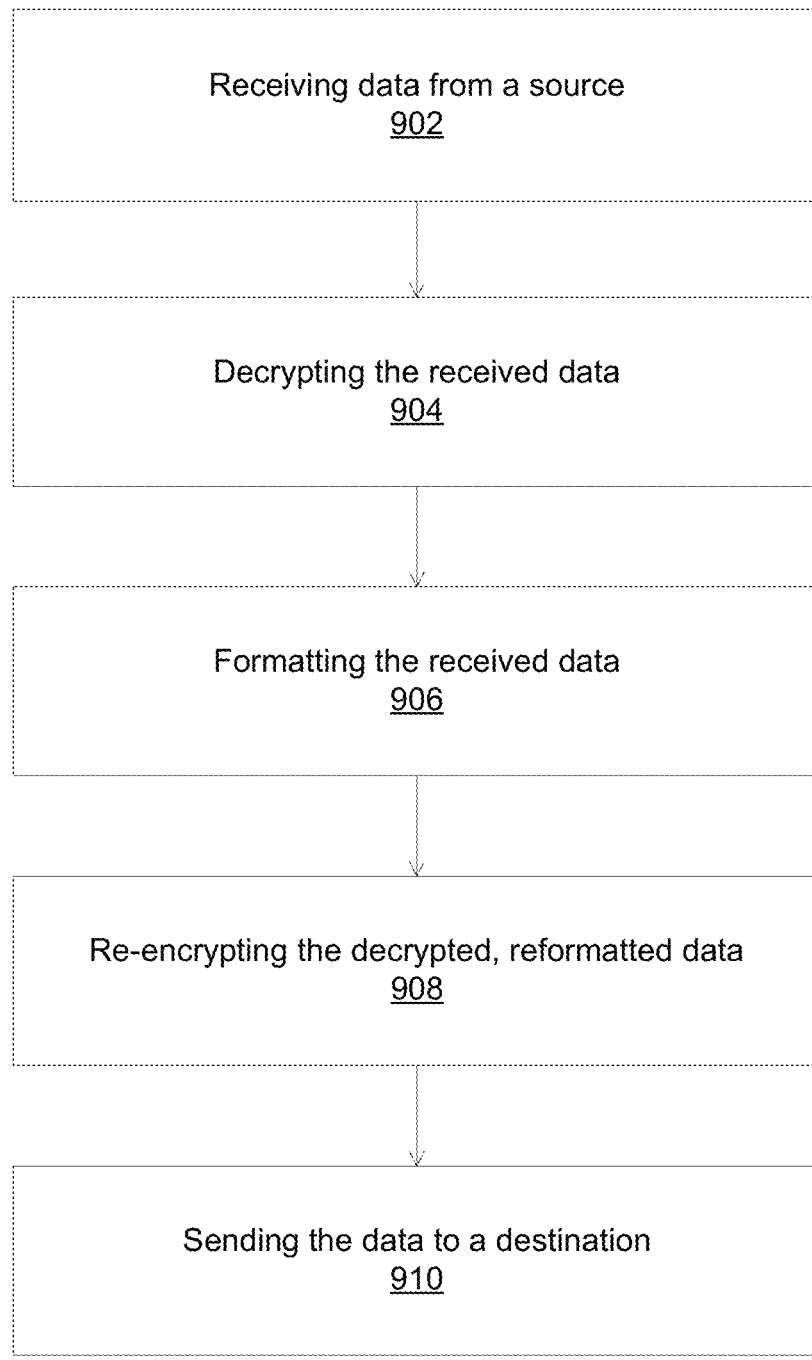
FIG. 9 is a flow diagram of a method for decrypting, encrypting, normalizing, and standardizing a data transaction from a source to a destination, according to at least one embodiment.

FIG. 9 is a flow diagram of a method for decrypting, encrypting, normalizing, and standardizing a data transaction from a source to a destination, according to at least one embodiment. Operation 902 receives data from a source, such as, e.g., a telematics data provider, server, on-board sensor, and/or external sensor. The data may be in a form based on the first protocol. The data may be encrypted according to a first encryption protocol. In other embodiments, the data may not be encrypted. Operation 904 decrypts the received data. Operation 906 reformats the received, decrypted data based on a second data transfer protocol, and according to a mapping interface. In some embodiments, the data may not be reformatted. Operation 908 re-encrypts the decrypted, reformatted data according to a second encryption protocol. In some embodiments, the data is not re-encrypted. Operation 910 seconds the re-encrypted, reformatted data to a destination, such as, e.g., a telemetry system of a vehicle or machine and/or a user interface of the platform of the present invention, based on a second data transfer protocol.

Figure 10:
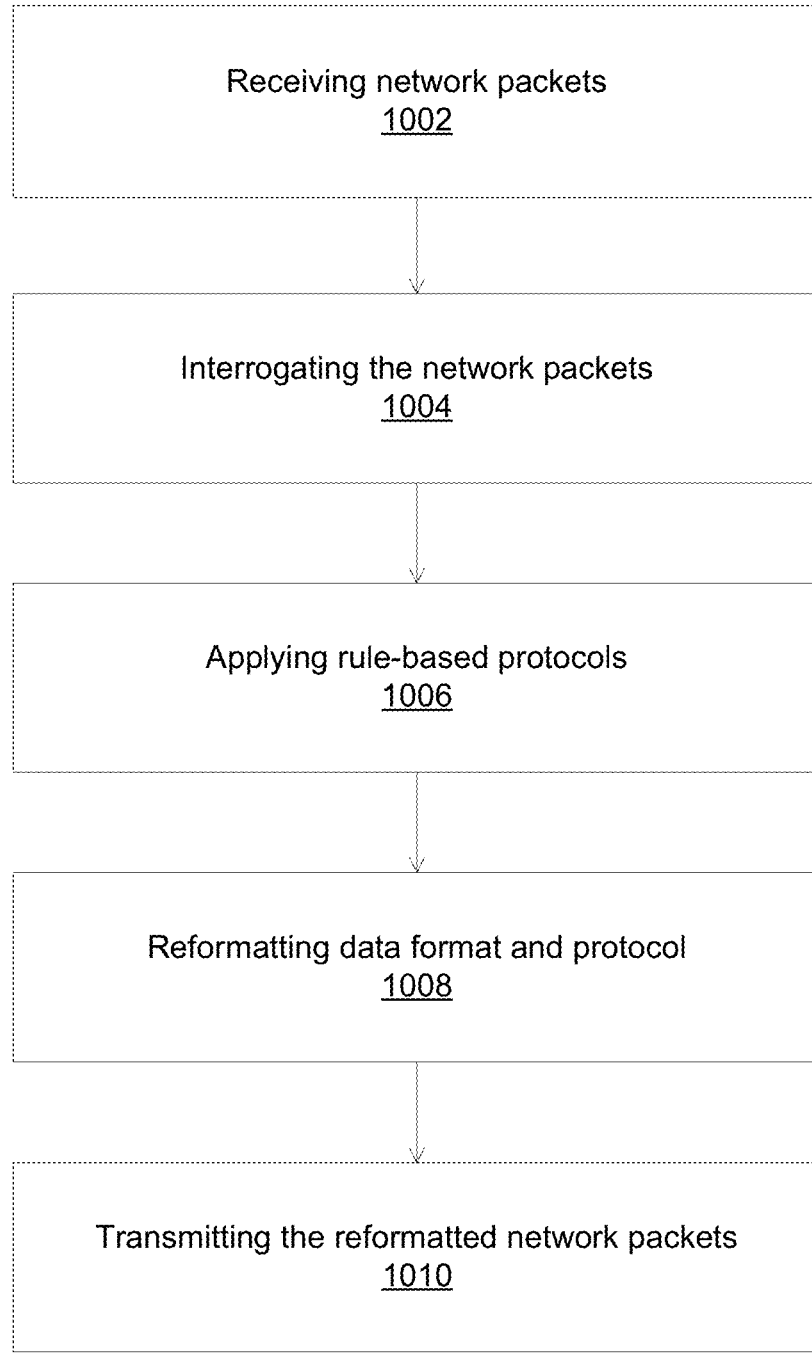
FIG. 10 is a flow diagram of a method for normalizing and standardizing network packets of a data transaction, according to at least one embodiment.

FIG. 10 is a flow diagram of a method for normalizing and standardizing network packets of a data transaction, according to at least one embodiment. Operation 1002 receives a number of network packets associated with a particular transaction from one or more sources, such as, e.g., a telematics data provider, server, on-board sensor, and/or external sensor. Operation 1004 interrogates the number of network packets received, which may include identifying criteria and embedded rules, limitations, and characteristics of the, such as, e.g., to determine the data format of the header and message. Operation 1006 applies a number of rule-based protocols based on the results operation 1004. Operation 1008 reformats a data format and a protocol of the received network packets so that the network packets are acceptable to one or more destinations, such as, e.g., a telemetry system of a vehicle or machine and/or a user interface of the platform of the present invention. Reformatting, for example, may include recomposing the header and message to comply with the data format and protocol of the destination. Operation 1010 transmits the reformatted network packets to the one or more destinations.

Figure 11:
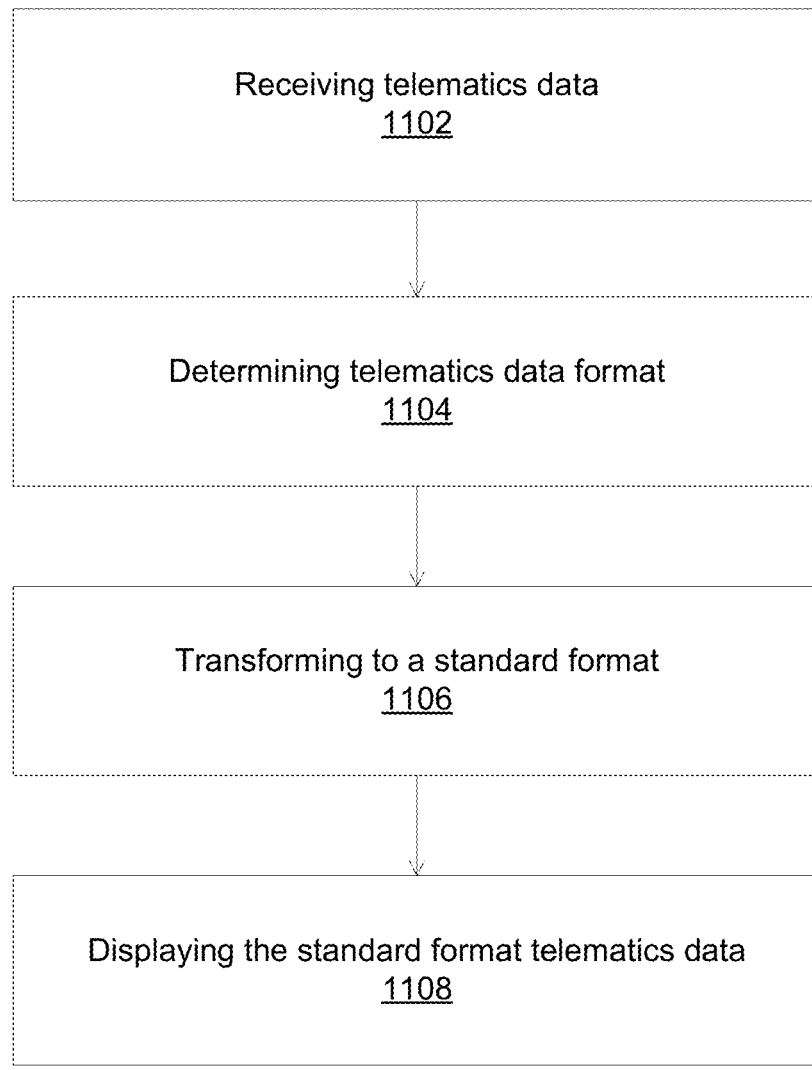
FIG. 11 is a flow diagram of a method for processing telematics data associated with multiple vehicles or machines, according to at least one embodiment.

FIG. 11 is a flow diagram of a method for processing telematics data associated with multiple vehicles or machines, according to at least one embodiment. Operation 1102 receives telematics data from a plurality of data providers after retrieving authentication information for accessing the data that are in communication with a plurality of vehicles or machines. The telematics data providers may include different applications of manufacturing companies, third-party telematics data providers, on-board telematics systems, and etc. Operation 1104 determines the format of the received data. The data from each of the telematics data providers may be in a non-standard format, such as, e.g., AEMP standard or non-AEMP standards, and/or a standard format, such as, e.g., a custom format proprietary to the platform of the present invention. Operation 1106 transforms the telematics data in the non-standard format to the standard format according to a mapping interface. In some embodiments, the telematics data may already be in the standard format, e.g., an API may be configured to accept the telematics data in the standard format from the corresponding telematics data providers. Multiple telematics data providers may be prioritized based on a level of confidence, such as, e.g., company reputation and/or quality measurement. Telematics data from the telematics data providers may include a unique identifier associated with the corresponding vehicle or machine. Operation 1108 displays the telematics data in standard format via a graphical user interface (GUI).

Figure 12:
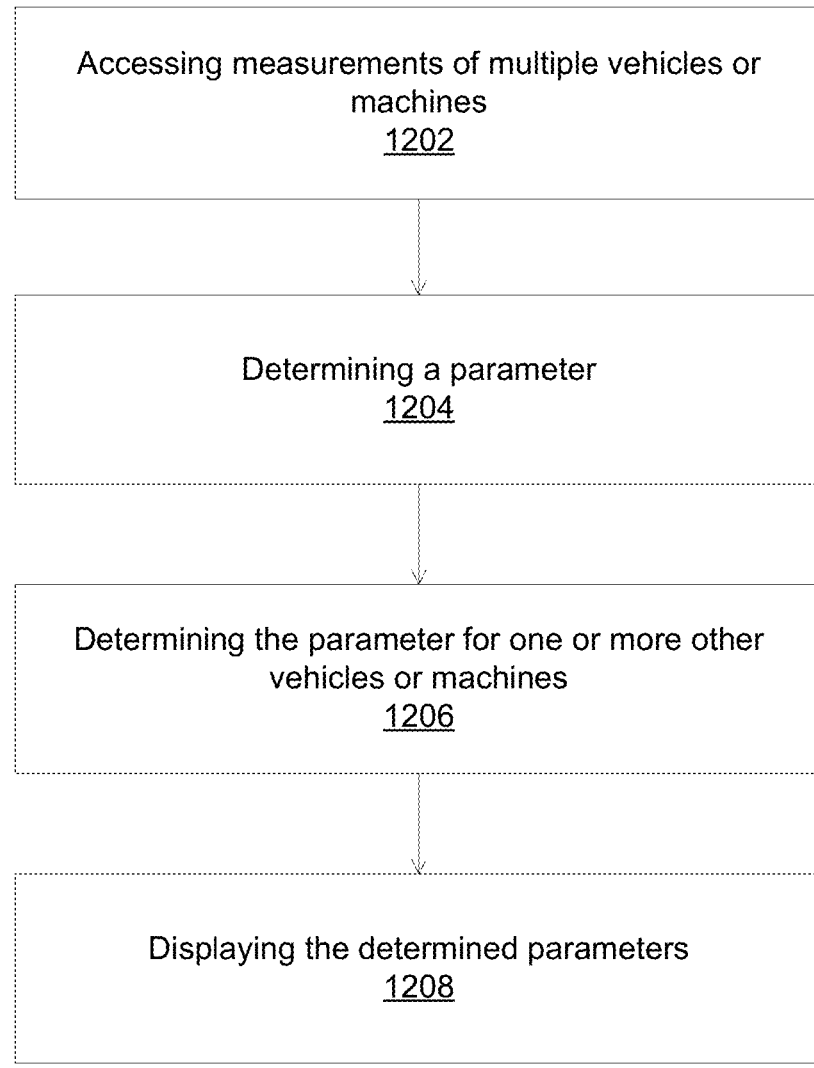
FIG. 12 is a flow diagram of a method for standardizing a vehicle or machine operation data, according to at least one embodiment.

FIG. 12 is a flow diagram of a method for standardizing a vehicle or machine operation data, according to at least one embodiment. Operation 1202 accesses measurements related to multiple vehicles or machines in a fleet, such as, e.g., location or speed. Operation 1204 determines a parameter for one or more vehicles or machines in the fleet using one or more measurements. For example, a distance traveled for a vehicle may be estimated using odometer measurements from the engine computer of the vehicle. Operation 1206 determines the same parameter for one or more vehicles or machines, such as, e.g., a distance traveled for a particular vehicle may be estimated using GPS position data of the other vehicles in the fleet. Operation 1208 displays the determined parameters, such as, e.g., through a GUI.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium, and/or may be performed in any order. The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A machine-implemented method, comprising:
    determining a first protocol and a first data format associated with a source,
    wherein the source is a telematics data provider, machine telemetry system, machine internal sensor, machine external sensor, mobile device, database, or any combination thereof;
    determining a second protocol and a second data format associated with a destination,
    wherein the destination is a telematics data provider, machine telemetry system, machine on-board sensor, machine external sensor, mobile device, database, or any combination thereof;
    determining whether the first protocol and the first data format of the source and the second protocol and the second data format of the destination are compatible;
    receiving telematics data from the source,
    wherein the data is encrypted according to a first encryption protocol;
    decrypting the received telematics data;
    reformatting the received, decrypted telematics data based on the second protocol and the second data format;
    re-encrypting the decrypted, reformatted telematics data according to a second encryption protocol;
    transmitting the re-encrypted, reformatted telematics data to the destination based on the second protocol and the second data format, and
    wherein the source is of a plurality of sources that is individually switched based on a data accuracy measurement of the plurality of sources.

2. A machine-implemented method, comprising:
    determining a first protocol and a first data format associated with a source,
    wherein the source is a telematics data provider, machine telemetry system, machine internal sensor, machine external sensor, mobile device, database, or any combination thereof;
    determining a second protocol and a second data format associated with a destination,
    wherein the destination is a telematics data provider, machine telemetry system, machine on-board sensor, machine external sensor, mobile device, database, or any combination thereof;
    determining whether the first protocol and the first data format of the source and the second protocol and the second data format of the destination are compatible;
    receiving telematics data from the source,
    wherein the data is encrypted according to a first encryption protocol;
    decrypting the received telematics data;
    reformatting the received, decrypted telematics data based on the second protocol and the second data format;
    re-encrypting the decrypted, reformatted telematics data according to a second encryption protocol;
    transmitting the re-encrypted, reformatted telematics data to the destination based on the second protocol and the second data format, and
    wherein the telematics provider is of a plurality of telematics data providers that is prioritized based on a level of confidence, and
    wherein the level of confidence is based on a company reputation, a data quality measurement, or both.

* * * * *